United States Patent [19]
Sortwell

[11] Patent Number: 5,185,409
[45] Date of Patent: Feb. 9, 1993

[54] PROCESS FOR PREPARING WATER SOLUBLE POLYMER GELS

[75] Inventor: Edwin T. Sortwell, Wheaton, Ill.

[73] Assignee: Diatec Environmental, Batavia, Ill.

[21] Appl. No.: 745,801

[22] Filed: Aug. 16, 1991

[51] Int. Cl.$^5$ ............................................. C08F 2/00
[52] U.S. Cl. ...................... 526/62; 526/299; 422/240; 422/241; 264/313; 264/314; 264/315
[58] Field of Search ............... 422/240, 241; 526/229, 526/62; 264/313, 314, 315, 316

[56] References Cited

U.S. PATENT DOCUMENTS

| | | | |
|---|---|---|---|
| 3,332,922 | 7/1967 | Hoover | 260/89.7 |
| 3,663,518 | 5/1972 | Patzelt et al. | 260/80.3 |
| 3,732,193 | 5/1973 | Svarz | 260/79.3 |
| 3,923,756 | 12/1975 | Svarz | 260/80.3 |
| 3,929,751 | 12/1975 | Gershberg | 260/89.7 |
| 4,032,701 | 6/1977 | Hughes | 526/88 |
| 4,138,539 | 2/1979 | Landolt et al. | 526/93 |
| 4,154,910 | 5/1979 | Tanaka et al. | 526/303.1 |
| 4,208,365 | 6/1980 | LeFeure | 264/313 |
| 4,260,713 | 4/1981 | Tanaka et al. | 526/215 |
| 4,283,517 | 8/1981 | Perricone et al. | 526/229 |
| 4,331,787 | 5/1982 | Fairchok et al. | 523/324 |
| 4,473,689 | 9/1984 | Login et al. | 526/93 |
| 4,604,411 | 8/1986 | Yada et al. | 522/14 |
| 4,713,434 | 12/1987 | Sutterlin et al. | 526/62 |
| 4,769,427 | 9/1988 | Nowakowsky et al. | 526/64 |
| 4,845,192 | 7/1989 | Sortwell et al. | 528/499 |
| 4,857,610 | 8/1989 | Chmelir et al. | 526/88 |

FOREIGN PATENT DOCUMENTS 1375979 12/1974 United Kingdom.

OTHER PUBLICATIONS

The Condensed Chemical Dictionary, 11th Edition (Van Nostrand Reinhold, 1987).

Wako Pure Chemical Industries, Wako V-50 Brochure, pp. 7, 19, 21.

Primary Examiner—Joseph L. Schofer
Assistant Examiner—David Wu
Attorney, Agent, or Firm—Marshall, O'Toole, Gerstein, Murray & Bicknell

[57] ABSTRACT

A process for preparing high molecular weight water soluble polymer gels having relatively narrow molecular weight distributions is disclosed. An aqueous reaction mixture comprising a solution of a water soluble vinyl monomer and a suitable catalyst system is polymerized in a reactor comprising a tube or bag of an oxygen-impermeable film in the substantial absence of oxygen.

27 Claims, No Drawings

PROCESS FOR PREPARING WATER SOLUBLE POLYMER GELS

BACKGROUND OF THE INVENTION

1. Field of the Invention

The invention relates generally to a method of preparing water soluble polymer gels and, more particularly, the invention is directed to a process for preparing a water soluble polymer gel having a relatively narrow molecular weight distribution and a relatively high molecular weight.

2. Description of Background Technology

The production of water soluble polymers by the polymerization of water soluble vinyl monomers in aqueous solutions is well known. Such polymerizations are often carried out in solution using relatively dilute monomer (and resulting polymer) concentrations, and in gel polymerization systems wherein relatively concentrated monomer solutions and polymer gel products are obtained.

Gel polymerization processes are advantageously carried out in the substantial absence of oxygen (which is a polymerization inhibitor for vinyl monomers) in the presence of a suitable reaction initiator (e.g. organic free radical generating initiators, redox initiation systems, etc.) in deep reactors whereby a product having a thick cross-section is produced. The polymerization reaction is strongly exothermic and in a reactor wherein the depth of the product is large, temperature gradients tend to form which result in non-uniform reaction rates across the product, resulting in often widely variable molecular weight distributions in gel products.

Prior polymerization systems and equipment typically are large, complicated, and expensive, or require multiple steps for implementation and control, which may adversely affect quality control. In some cases, prior systems require multiple batch operation.

Prior thin film polymerization (i.e. continuous band polymerization) systems are mechanically and chemically complicated and very expensive.

SUMMARY OF THE INVENTION

It is an object of the invention to overcome one or more of the problems described above.

According to the invention, at least one vinyl monomer is polymerized to form a polymer gel by preparing a substantially oxygen-free reaction mixture of an aqueous solution of the monomer(s) and a suitable catalyst system, introducing the reaction mixture to a substantially oxygen-free reactor formed of an oxygen impermeable film, and allowing the reaction mixture to polymerize.

Selection of the catalyst system, the concentration thereof, and the reactor dimensions allows the preparation of water soluble polymer gels having a desired intrinsic viscosity with a relatively narrow molecular weight distribution.

The reaction system of the invention is simple and economical to operate, and does not require large capital investment. A simple closed agitated tank, and a sufficient length of floor space to support the reactor and product are sufficient.

Other objects and advantages of the invention will be apparent to those skilled in the art from the following detailed description taken in conjunction with the appended claims.

DETAILED DESCRIPTION OF THE INVENTION

According to the invention, water soluble polymers of vinyl (e.g. acrylic) monomers are prepared by utilizing commercially available monomer solutions or dissolving the solid monomer in water to a desired monomer concentration which is generally about 20 to about 60 wt. %, and preferably at least about 28 wt. %. The monomer solution is then purged of oxygen by a stream of inert gas, preferably nitrogen gas, and a catalyst system is added to the purged solution with thorough mixing in a mixing vessel. In one embodiment, separate components of a multicomponent catalyst system are generally added stepwise with intermediate thorough mixing of each component.

After addition and mixing of the catalyst system (or the final catalyst component) and before significant viscosity build-up can reduce mobility, the reaction mixture is introduced (e.g. by gravity) into a reactor comprising a tube or bag formed of an oxygen impermeable flexible film which has previously been purged of oxygen and formed into its desired configuration with nitrogen or another inert gas. The filled or partially filled reactor is contained in or supported by a flat trough or other mold box shaped such that the resulting reactor has a depth of about 20 inches or less, and preferably is wider than it is deep. The depth of the reaction mixture is at least about 2 inches, and preferably less than about 10 inches, and highly preferably about 6 to about 8 inches.

The inert gas displaced by the reaction mixture from the reactor is recycled into the mixing vessel in order to maintain a substantially oxygen-free atmosphere in order to avoid deactivation of the reaction. The gas recycle is preferably supplemented by additional inert gas as needed to maintain a positive inert gas pressure in the mixing vessel relative to the atmosphere.

The polymerization reaction takes place inside the reactor and, at completion, the resulting slab of polymer gel may be dried, shipped or used as is, or used directly for further processing, such as in the preparation of aminomethylated (so-called Mannich) polymers, or in other reactions. It is particularly useful to roll the slab to improve handling or to facilitate preparation of large volumes of solution or potential drying.

The resulting polymer exhibits much less variability in molecular weight than commercially available polymers made by other means. The reaction system is relatively simple and low cost.

The process of the invention is applicable to the polymerization of any of a wide variety of ethylenically unsaturated water soluble monomers including, for example, acrylamide, acrylic and methacrylic acids and water soluble salts thereof; alkyl aminoalkyl esters of acrylic and methacrylic acids and the corresponding quaternary ammonium derivatives thereof; and 2-vinylimidazoline and 2-vinylpyrimidine and the corresponding quatenary ammonium derivatives thereof. Such monomers may be homopolymerized or polymerized with one or more comonomers.

Acrylamide is a preferred monomer for use in the invention.

The polymerization reaction is strongly exothermic in nature and therefore acrylamide monomer concentrations of greater than about 30 wt. % for homopolymerization are generally not desired. Somewhat higher concentrations (e.g. up to about 60 wt. %) may be utilized for the preparation of other homopolymers or copolymers. The reaction is initiated at temperatures as low as 50° F. and may rise to up to 190° F., depending on the monomers and their concentrations.

Monomer concentrations in the range of about 20 to about 30 wt. %, typically about 28 wt. %, are useful for the preparation of homopolymer acrylamide gels.

Gel polymerization processes of the invention are particularly useful in preparing acrylamide homopolymers having intrinsic viscosities (IV, Cannon-Ubbelodhe intrinsic viscosity in 4 wt. % aq. sodium chloride) of about 19 and above. Anionic and cationic copolymers having high intrinsic viscosities are obtainable using the gel polymerization process of the invention.

The catalyst system comprises one or both of a free radical initiator and a redox catalyst system. The redox component is of the type generally known in the art which allows the polymerization to be initiated at relatively low temperatures (e.g. about 50° to 55° F.). Such redox catalyst systems include a reducing agent and an oxidizing agent which react to form radical intermediates that initiate the polymerization of the monomer or of the monomer mixture. Suitable oxidizing agents include peroxides, chlorates, bromates, hypochlorites, peroxydisulfates, and atmospheric oxygen. Corresponding reducing agents are for example sulfites, mercaptans, sulfonates, thiosulfates, and hyposulfates. Suitable materials include persulfates such as potassium persulfate, for example, used with a sulfite such as sodium sulfite. Ammonium persulfate and ammonium ferrous sulfate are useful constituents of the redox system.

A useful redox catalyst system includes sodium bisulfite and ammonium persulfate.

The free radical initiator is an organic free radical generating initiator such as an azo compound capable of initiating the polymerization reaction at relatively high temperatures (e.g. about 75° F. and above). Such compounds and combinations thereof are disclosed in Tanaka, et al. U.S. Pat. No. 4,260,713 (Apr. 7, 1981), the disclosure of which is incorporated herein by reference. A preferred organic initiator is 2,2'-azobis (2-amidinopropane) hydrochloride which is available from Wako Pure Chemical Industries (Osaka, Japan) under the trade designation V-50. V-30, V-76, and V-80 initiators from Wako are also useful, and initiate at different temperatures.

The concentration of the total catalyst system in the reaction mixture may be within ranges generally known in the art, for example in the range of about 0.001 to about 0.002 wt. %. Concentrations in the range of about 0.00145 to about 0.00165 wt. % are preferred, and the weight ratio of the redox system to the organic free radical generator is preferably in the range of about 2.5:1 to about 3.5:1. If desired, however, either the redox system or the free radical generator may be used alone. If the free radical generator is used alone, the reaction mixture must be brought to a sufficiently high temperature (e.g. 70° F.) for initiation to take place, and this may call for a reduced monomer concentration.

A highly preferred catalyst system comprises 0.00056 wt. % sodium bisulfite, 0.00056 wt. % ammonium persulfate, and 0.00042 wt. % 2,2'-azobis (2-amidinopropane) dihydrochloride, based on total reaction mixture.

Chain transfer agents as known in the art (e.g. isopropyl alcohol, thiosulfates, etc.) may be present, if desired, to lower product molecular weight.

The molecular weight and thus the intrinsic viscosity of the polymer is a function of the amount of catalyst used, and the variability in these parameters is minimized by the use of a relatively thin reaction vessel.

The molecular weight distribution of the product can be directly varied by varying the proportion of the redox component to the organic component in the catalyst. Further, product molecular weight is an inverse function of total catalyst concentration, assuming that sufficient redox component is present to carry the reaction temperature to the organic initiator's threshold temperature.

The reaction vessel comprises a tube or bag of a flexible oxygen impermeable film, preferably formed of a polyolefin. The film is preferably non-adherent to the resulting polymer gel.

Ethylene vinyl alcohol films such as the preferred Eval® film obtainable from Evalca of Lisle, Ill. are suitable, as are films formed of polyvinyl alcohol and very thick polyethylene. Preferred Eval® films are those coextruded with polyethylene, and are suitably greater than one mil, and preferably at least 3 to about 4.5 mil in thickness for tear resistance.

Eval® films are typically available in the form of 66 inch wide flat tubes, and such tubes are ideal for use as reactors according to the present invention. The tube may be disposed on a 54 inch wide wooden pallet with 10 to 12 inch sidewalls or contained by sides supported externally on the floor and may be filled to a desired depth (e.g. 6-8 inches) with liquid reaction mixture, leaving a small (e.g. 4-6 inches) gap for an inert gas such as nitrogen. In any event, the thickness of the reaction mixture contained in the reactor should be less than 20 inches, preferably less than 10 inches and more than 2 inches, and highly preferably in the range of about 6 to about 8 inches.

To carry out the reaction, the monomer(s) are dissolved in water, preferably in the presence of an oxygen purge. When ready to begin the reaction sequence, the monomer solution is purged of oxygen with a flow of nitrogen gas, preferably to an oxygen concentration of less than about 0.1 ppm. The nitrogen purge stream should contain about 5 ppm or less $O_2$.

The components of the catalyst system are then added in sequence, with at least one component of the redox system added after the addition of the organic free radical generator, unless the free radical generator is used alone. The components are added with thorough mixing after addition of each component.

A preferred catalyst addition sequence is ammonium persulfate followed by mixing (e.g. for two minutes), followed by addition of the organic free radical generator with mixing for two additional minutes, followed by the addition of the sodium bisulfite component of the redox system with mixing for two additional minutes. The resulting reaction mixture should be introduced to the reactor, preferably immediately (preferably within about five minutes after addition and mixing of the final catalyst component) and in any event before viscosity build-up compromises the fluidity of the reaction mixture.

The reactor is purged of oxygen prior to introduction of the reaction mixture to the reactor. The reactor is closed at the end opposite the point of introduction, which is also closed after introduction of the reaction mixture.

When using dry acrylamide monomer, dissolving in water results in a drop in temperature of the resulting mixture due to the negative heat of dissolution of the monomer. For example, if 28 wt. % acrylamide monomer is added to water at a temperature of 75° F., the temperature will typically drop to a temperature in the range of about 53° to 55° F. Since the redox component of the catalyst system initiates the reaction at a relatively low temperature (e.g. 55° F.) the polymerization reaction will begin promptly after addition of the final redox component to the mixture. Since the reaction is exothermic, the temperature of the reaction mixture will rise as a reaction proceeds. When the reaction reaches a temperature of about 70° F., the organic free radical generator initiator will be activated and allow the reaction to proceed further at temperatures greater than 75° F.

A maximum temperature of about 190° F. may be reached depending on the monomer concentration, and the reaction may be expected to proceed for up to about 7 hours, typically in the range of 3 to 7 hours (e.g. 4 hours) for acrylamide homopolymerization and preparation of anionic copolymers.

The characteristics of the process allow for the practical use of very much longer reaction times (e.g. days or weeks) without an attendant economic barrier or penalty other than the use of floor space. The invention allows the production of large quantities of product without substantially increased capital expenditures.

The narrowness of the molecular weight distribution is maximized by the use of a high surface area reaction vessel giving a low solution viscosity for the later diluted products.

The specific shape of the reactor vessel is not critical and the containing mold for the tube may be formed in rectangular or other convenient shapes.

EXAMPLE

The invention is illustrated by the following specific example, which is not to limit the scope of the invention.

The following reaction mixture was used to prepare an acrylamide homopolymer having an IV of 19:

| Component | Weight % |
| --- | --- |
| Acrylamide | 28.0 |
| Water | 71.99846 |
| Ammonium Persulfate | 0.00056 |
| 2,2' Azobis (2-amidinopropane) hydrochloride (V-50) | 0.00042 |
| Sodium Bisulfite | 0.00056 |

5,500 pounds of dry acrylamide monomer were added to 14,140 pounds of demineralized water at 75° F., with mixing. After complete dissolution in the presence of oxygen, the monomer solution (at 53° F.) was transferred to a gel casting tank and the pH was adjusted to 4.0±0.2, while agitating, with dilute hydrochloric acid. The monomer solution was then purged with nitrogen to less than 0.15 ppm oxygen, the catalysts were added in the order given above with two minutes mixing after each addition. Following the final two minute catalyst mix the entire solution was fed by gravity in five minutes into a previously nitrogen-purged tube contained by mold side-walls. Polymerization began immediately and was essentially complete in four hours, producing a cast gel slab of 56"×6½"×123'.

The foregoing detailed description is given for clearness of understanding only, and no unnecessary limitations should be understood therefrom, as modifications within the scope of the invention will be apparent to those skilled in the art.

I claim:

1. A process for preparing a water-soluble polymer gel comprising the steps of:
   (a) forming an aqueous solution of one or more vinyl monomers;
   (b) mixing said monomer solution with a catalyst system comprising one or both of a redox system and an organic free-radical generating initiator to form a reaction mixture;
   (c) introducing said reaction mixture to a reactor comprising a flexible oxygen-impermeable film, said reaction mixture having a depth of less than about twenty inches; and,
   (d) allowing the monomer(s) present in said reaction mixture to polymerize to form a water-soluble polymer gel product, each of said steps (b)–(d) being carried out in the substantial absence of molecular oxygen.

2. The process of claim 1 wherein the concentration of monomer(s) in said solution of step (a) is about 20 to about 60 wt. %.

3. The process of claim 1 wherein said redox system comprises sodium bisulfite and ammonium persulfate.

4. The process of claim 1 wherein said organic free radical generating initiator is an azo initiator.

5. The process of claim 4 wherein said azoinitiator is 2,2'-azobis (2-amidinopropane) hydrochloride.

6. The process of claim 1 wherein said monomer solution of step (a) is purged of oxygen with an inert gas prior to step (b), said reactor is purged of oxygen with an inert gas prior to step (c), and the components of said catalyst system are added to said monomer solution stepwise with mixing between steps.

7. The process of claim 6 wherein said redox system comprises at least two essential components, and at least one of said components is added to said monomer solution after addition of said organic free radical generating initiator.

8. The process of claim 1 wherein said reaction mixture has a depth of at least about 2 inches.

9. The process of claim 8 wherein said reaction mixture has a depth of about 10 inches or less.

10. The process of claim 9 wherein said reaction mixture has a depth of about 6 to about 8 inches.

11. The process of claim 1 wherein said flexible oxygen-impermeable film comprises a polyolefin.

12. The process of claim 1 wherein said film is formed of a material selected from the group consisting of ethylene-vinyl alcohol copolymers, polyvinyl alcohol, and polyethylene.

13. The process of claim 12 wherein said flexible film comprises an ethylene-vinyl alcohol copolymer coextruded with polyethylene.

14. The process of claim 11 wherein said flexible oxygen-impermeable film is greater than 1 mil in thickness.

15. The process of claim 14 wherein said flexible oxygen-impermeable film is about 3 to about 4.5 mils in thickness.

16. The process of claim 1 wherein said flexible oxygen-impermeable film is in the form of a tube or a bag.

17. The process of claim 1 wherein a gap exists between said reaction mixture and the top of said reactor, and said reactor is maintained free of oxygen with an inert gas flowed through said gap.

18. The process of claim 1 further comprising the step of forming said water-soluble polymer gel product into a roll.

19. The process of claim 1 wherein said vinyl monomer is selected from the group consisting of acrylic and methacrylic acids and water soluble salts thereof; alkyl aminoalkyl esters of acrylic and methacrylic acids and the corresponding quaternary ammonium derivatives thereof; and 2-vinylimidazoline and 2-vinylpyrimidine and the corresponding quaternary ammonium derivatives thereof.

20. The process of claim 1 wherein said monomer comprises acrylamide.

21. The process of claim 20 wherein said monomer consists essentially of acrylamide and is present in said monomer solution at a concentration of about 20 to about 30 wt. %.

22. The process of claim 6 wherein oxygen concentration in said inert gas is not greater than about 5 ppm.

23. The process of claim 22 wherein the oxygen concentration in said reaction vessel is less than about 0.1 ppm.

24. The process of claim 1 wherein the concentration of said catalyst system in said reaction mixture is about 0.001 to about 0.002 wt. %.

25. The process of claim 24 wherein said concentration is about 0.00145 to about 0.00165 wt. % based on total reaction mixture.

26. The process of claim 1 wherein said organic free-radical generating initiator is used without a redox initiator component, and further comprising the step of raising the temperature of said reaction mixture to a sufficiently high temperature for initiation to take place.

27. A process for preparing a water-soluble polymer gel comprising the steps of:
  (a) forming an aqueous solution of one or more vinyl monomers including acrylamide;
  (b) purging said monomer solution with an inert gas;
  (c) mixing said monomer solution with a catalyst system comprising sodium bisulfite, ammonium persulfate, and 2,2'-azobis (2-amidinopropane) hydrochloride to form a reaction mixture, wherein the components of said catalyst system are added to said monomer solution stepwise with mixing between steps and at least one of said sodium bisulfite and ammonium persulfate is added to said monomer solution after addition of said 2,2'-azobis (2-amidinopropane) hydrochloride;
  (d) purging said reactor of oxygen with an inert gas;
  (e) introducing said reaction mixture to a reactor comprising a flexible oxygen-impermeable film in the form of a tube or a bag, said reaction mixture having a depth of about two to about ten inches, wherein a gap exists between said reaction mixture and a top surface of said reactor, and said reactor is maintained free of oxygen with an inert gas flowed through said gap; and
  (f) allowing the monomer(s) present in said reaction mixture to polymerize to form a water-soluble gel product, each of said steps (b)–(f) being carried out in the substantial absence of molecular oxygen.

* * * * *